(12) United States Patent
Schmell et al.

(10) Patent No.: US 10,571,292 B2
(45) Date of Patent: Feb. 25, 2020

(54) METHOD AND SYSTEM FOR DETERMINING A ROUTE FROM A MOTOR VEHICLE LOCATION TO A DESTINATION

(71) Applicant: AUDI AG, Ingolstadt (DE)

(72) Inventors: Christian Schmell, Ingolstadt (DE); Johannes Kniep, Löhne (DE); Günter Hildebrandt, Dollnstein (DE); Christoph Weigand, Ingolstadt (DE); Florian Schwensfeier, Oberhausen (DE)

(73) Assignee: AUDI AG, Ingolstadt (DE)

( * ) Notice: Subject to any disclaimer, the term of this patent is extended or adjusted under 35 U.S.C. 154(b) by 13 days.

(21) Appl. No.: 16/089,996

(22) PCT Filed: Apr. 26, 2017

(86) PCT No.: PCT/EP2017/059969
§ 371 (c)(1),
(2) Date: Sep. 28, 2018

(87) PCT Pub. No.: WO2017/198434
PCT Pub. Date: Nov. 23, 2017

(65) Prior Publication Data
US 2019/0120643 A1    Apr. 25, 2019

(30) Foreign Application Priority Data
May 14, 2016 (DE) .......................... 10 2016 005 937

(51) Int. Cl.
*G01C 21/34* (2006.01)
*G08G 1/01* (2006.01)
*G08G 1/087* (2006.01)
*G05D 1/00* (2006.01)

(52) U.S. Cl.
CPC ..... *G01C 21/3492* (2013.01); *G01C 21/3438* (2013.01); *G08G 1/0112* (2013.01);
(Continued)

(58) Field of Classification Search
None
See application file for complete search history.

(56) References Cited

U.S. PATENT DOCUMENTS 8,577,589 B2    11/2013  Shin et al.
8,612,136 B2 *  12/2013  Levine ................... G01C 21/32
                                                  340/905
(Continued)

FOREIGN PATENT DOCUMENTS

DE    102007040633 A1    3/2009
DE    102014217453 A1    3/2015
(Continued)

OTHER PUBLICATIONS

International Preliminary Report on Patentability directed to related International Patent Application No. PCT/EP2017/059969, dated Aug. 1, 2018, with attached English-language translation; 11 pages.
(Continued)

*Primary Examiner* — Abdhesh K Jha
(74) *Attorney, Agent, or Firm* — Sterne, Kessler, Goldstein & Fox P.L.L.C.

(57) ABSTRACT

Embodiments of the present disclosure relate to a method and a system for determining a route from a motor vehicle location to a destination, in which a vehicle control unit transmits an emergency call to a recipient of a central exchange. In the process, a computing device at the central exchange determines the route to the destination. In the process, the computing device of the central exchange takes into account, in selecting the destination, a first time period which the motor vehicle requires to traverse the route and a second time period which a rescue vehicle requires to reach the destination. The computing device selects the destination such that a sum of the two time periods is minimal.

12 Claims, 2 Drawing Sheets

(52) U.S. Cl.
CPC ........... *G08G 1/0125* (2013.01); *G08G 1/087* (2013.01); *G05D 1/0088* (2013.01); *G05D 2201/0213* (2013.01)

(56) References Cited

U.S. PATENT DOCUMENTS

| | | | |
|---|---|---|---|
| 2008/0046173 A1* | 2/2008 | Lappe | G01C 21/28 |
| | | | 701/533 |
| 2009/0063033 A1 | 3/2009 | Schmidt | |
| 2014/0278104 A1 | 9/2014 | Proietty et al. | |
| 2015/0066284 A1 | 3/2015 | Yopp | |
| 2015/0323330 A1* | 11/2015 | Lord | G06Q 10/025 |
| | | | 701/410 |
| 2016/0012720 A1 | 1/2016 | Boss et al. | |
| 2017/0072967 A1 | 3/2017 | Fendt et al. | |

FOREIGN PATENT DOCUMENTS

| | | |
|---|---|---|
| DE | 102014210147 A1 | 12/2015 |
| EP | 2141456 A2 | 1/2010 |
| EP | 2860078 A1 | 4/2015 |

OTHER PUBLICATIONS

English-language abstract of European Patent Application Publication No. EP 2860078 A1, published Apr. 15, 2015; 10 pages.
International Search Report and Written Opinion of the International Searching Authority directed to related International Patent Application No. PCT/EP2017/059969, dated Oct. 30, 2017, with attached English-language translation; 24 pages.

\* cited by examiner

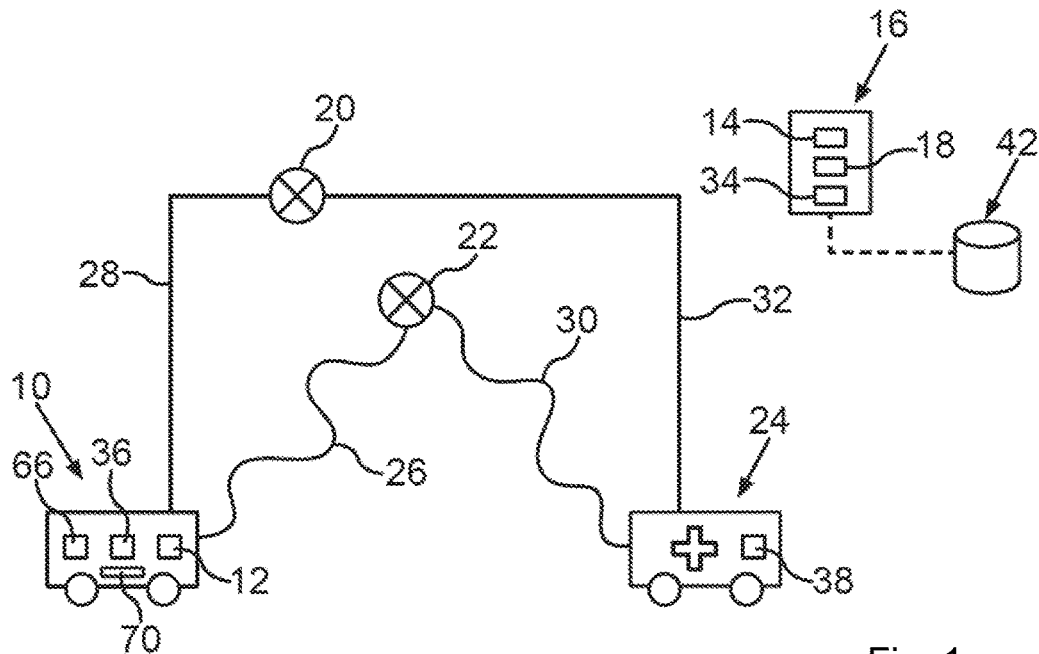
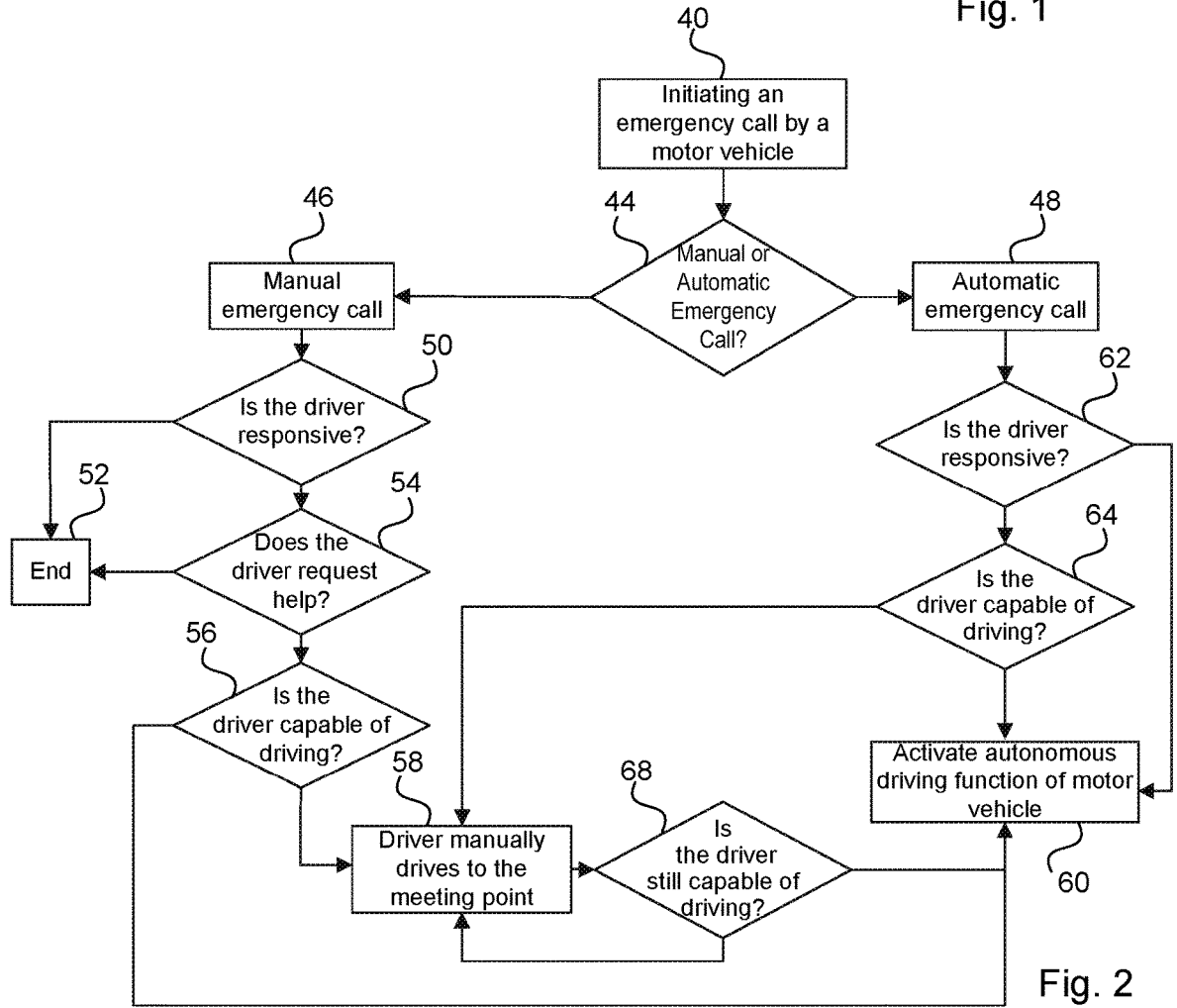
Fig. 1
Fig. 2

METHOD AND SYSTEM FOR DETERMINING A ROUTE FROM A MOTOR VEHICLE LOCATION TO A DESTINATION

TECHNICAL FIELD

The present disclosure relates to a method for determining a route from a motor vehicle location to a destination. Here, a vehicle control device conveys an emergency call to a recipient of a central exchange. A computing device at the exchange determines the route to the destination. The present disclosure further relates to a system for determining a route from a motor vehicle location to a destination.

BACKGROUND

DE 10 2014 217 453 A1 describes an autonomous vehicle controller for an impaired driver of a vehicle in which a vehicle computer is designed to communicate with a server. The server can instruct the vehicle to drive to a pre-selected medical emergency facility in autonomous mode or to drive to a meeting point for meeting an emergency service such as an ambulance.

DE 10 2007 040 633 A1 relates to a method in which a user terminal with a navigation application transmits a current position of the user terminal to a central exchange service of a hospital. In the central exchange service, a route to the current position is calculated to lead an ambulance to the location of a user terminal.

EP 2 860 078 A1 describes a method for operating a safety system of a motor vehicle in which a vehicle is led autonomously to a hospital if a driver incapacity is recognized, and the driver needs medical attention.

DE 10 2014 210 147 A1 relates to a control system for autonomous guidance of a vehicle. In the process, an autonomous vehicle is towed by a lead vehicle which issues sensor signals designed to facilitate the autonomous driving of the towed vehicle. The vehicle is towed to a location at which rescue services have easy access.

Conventional techniques for determining a route from a motor vehicle location to a destination also include a method for the driver of a motor vehicle who is no longer capable of driving it to initiate or trigger a manual or automatic emergency call. In the process, a data packet is transmitted to an emergency exchange, the packet containing the geographic position of the vehicle and if necessary other information such as the type of vehicle, seriousness of the accident, number of persons in the motor vehicle and the like. A rescue service or rescue vehicle nearest to the motor vehicle sending the emergency call then makes its way to the location of the motor vehicle according to corresponding information provided by the emergency exchange.

However, depending on the starting position or initial position where the rescue vehicle is located, and depending on traffic situations, the route to the motor vehicle sending the emergency call can vary significantly. This is particularly the case when there are traffic jams in place along the route to the motor vehicle that sent the emergency call. Thus, a disadvantage on the one hand is the long drive when the rescue services are initially a long distance away, and also the delay of the trip due to unfavorable traffic situations such as traffic jams.

SUMMARY

The problem for the embodiments of the present disclosure to solve is therefore to provide a method and a system of the type mentioned above such that aid to the motor vehicle sending the emergency call can come very quickly from rescue vehicle emergency teams.

In a method according to an embodiment of the present disclosure for determining a route from a motor vehicle location to a destination, a vehicle control unit transmits an emergency call to a recipient at a central exchange. A computing device at the exchange determines the route to the destination. In the process, in selecting the destination the computing device of the central exchange takes into account a first time period that it would take for the motor vehicle to traverse the route. The computing device also takes into account a second time period which a rescue vehicle would require to reach the destination. The destination selected by the computing device is such that a sum of the two time periods is minimal. In other words, the routes from the motor vehicle to the destination and from the rescue vehicle to the destination is optimized relative to the time of arrival. The destination is thus a meeting point to which the motor vehicle which sent the emergency call and the rescue vehicle both make their way. The meeting point or destination which requires the shortest total travel time becomes the selected destination. There, the motor vehicle meets up with the rescue vehicle or rescue team.

This is based on the fact that a traffic jam can be caused by an accident involving the motor vehicle which issued the emergency call immediately thereafter if the motor vehicle remains at this location. On the other hand, if the motor vehicle is still drivable and gets to a meeting point at which the motor vehicle can be safely parked, in particular without the risk of a traffic jam, the rescue vehicle can get to this meeting point or destination very quickly. As such, very quick aid from rescue teams, which get to the meeting point with the rescue vehicle, can be achieved for the motor vehicle sending the emergency call. Thus, in many cases a much shorter time before rescue teams can render aid is achieved.

Here, the discussion will concern rescue vehicles for the sake of simplicity. However, more than one rescue vehicle can also get to the destination along a corresponding route within the second time period.

It can be advantageous if the computing device determines a plurality of possible destinations based on map data and/or based on data provided from other motor vehicles and then selects the destination to be driven to by the motor vehicle and the rescue vehicle from the possible destinations. Specifically, it is possible to uncover possible destinations very easily using maps and classify them in the form of safe meeting points, such as public parks, rest stops and the like.

In addition, or alternatively, swarm data, (e.g., data which can be made available by other motor vehicles in a database, for example, and which can be evaluated by the computing device accessing the database), can be taken into account in the selection of the destination. For example, a possible meeting point can be identified as a safe destination in view of current traffic volume. On the other hand, the same meeting point can be classified as more prone to accidents when there is high traffic volume. Therefore, by taking swarm data into account, safe destinations within the vicinity of the motor vehicle issuing the emergency call can be located with a very high reliability.

It is particularly easy to limit the computing effort by the computing device when the computing device determines a plurality of possible destinations and/or a plurality of possible rescue vehicles depending on a distance from the destinations and/or the rescue vehicles to the motor vehicle.

Then, the only requirement is to calculate routes for possible meeting points and rescue vehicles located in the vicinity of the motor vehicle.

Data indicating a geographic position of the destination can be conveyed to a navigation system in the motor vehicle and/or to a navigation system in the rescue vehicle from a transmitting device at the central exchange. As such it can be very easy to facilitate the motor vehicle and the rescue vehicle quickly getting to the common destination or meeting point using the respective navigation systems. This provides corresponding aid to the passengers of the motor vehicle sending the emergency call very quickly.

This applies in particular when additional or alternative data are conveyed to the navigation system of the motor vehicle and/or to the navigation system of the rescue vehicle from the transmitting device of the central exchange, the navigation systems providing the route from the motor vehicle to the destination and the route from the rescue vehicle to the destination. Then, the navigation systems of the motor vehicle and the rescue vehicle no longer have to carry out individual calculations, but rather the route information is directly available for the navigation systems of the motor vehicle on the one hand and the rescue vehicle on the other hand. This can save valuable time.

This can be important, for instance, when the computing device of the central exchange, which can be an emergency call exchange in particular, has a greater computing power than the respective computing units or processors of the navigation systems.

The computing device can examine whether an assumption made in the selection of the destination is still appropriate while the motor vehicle and the rescue vehicle are en route to the destination. When a deviation of the at least one assumption is determined, the computing device changes the route of the motor vehicle and/or the rescue vehicle to the destination. In addition, or alternatively, the computing device can change the destination of such a deviation is established. In this way, changing circumstances can be easily taken into account, for example if the time period to reach the destination has changed due to the traffic volume or an accident, and thus another destination can be reached more quickly now. Such an examination can be performed by the computing device at periodic intervals.

In the examination, the computing device can access traffic information and/or data made available from other motor vehicles, i.e. swarm data. Thus, very quick adjustments to the routes and/or destination can be made.

Another advantage has been shown to be for the computing device to include data made available by other motor vehicles and/or from a traffic central exchange when the first time period and the second time period are determined. In the traffic central exchange, the results of a monitoring of the traffic situation can be made available to selected locations, such as locations being used for controlling variable traffic signs, for example. By evaluating the corresponding data of the traffic central exchanges and/or by evaluating swarm data, the first time period and the second time period can be calculated very close to real time.

In the process, it has been shown to be advantageous for the computing device to determine a current traffic volume from the data. In addition, or alternatively, the computing device can determine an expected change in the traffic volume depending on the day of the week and/or the time of day. Thus, rush hours can be taken into account, for example, as often occur during a shift change at a very large company or during morning and evening commuter traffic.

It is also conducive to very precise determinations of time periods if the computing device can determine, from the data, a switching of traffic lights along the route of the motor vehicle and the rescue vehicle on the way to the destination.

Road conditions can be taken into account along the route of the motor vehicle and/or the rescue vehicle to the destination. Thus, in winter, for example, whether or not a first route has been cleared free of snow and a second route has not been so cleared can play a role. Taking this parameter into account is thus conducive to minimizing the total of the two time periods.

Another advantage has been shown to be that the computing device determine, from the data, the presence of at least one speed limit along the route of the motor vehicle and/or the rescue vehicle to the destination. This parameter also has an effect on the duration of the respective time period.

Moreover, the computing device can determine, from the data, a way to exceed at least one speed limit along the route of the motor vehicle or the rescue vehicle to the destination while maintaining a safe driving mode of the motor vehicle or rescue vehicle. Thus, for example, some speed limits may be in place along a route for noise control reasons. However, along this route the rescue vehicle in particular can exceed the speed limit and still remain safe. By taking such possibilities into consideration, the destination can be reached very quickly.

The question of whether a driver of the motor vehicle is responsive can come into play in a manual initiation and/or an automatic initiation of the emergency call. In this way, when the emergency call is initiated manually by a passenger of the motor vehicle, a determination can first be made as to whether aid is actually required. If such is the case, one can come to know whether the driver of the motor vehicle is capable of driving. If so, the driver has the option of driving the motor vehicle himself to the destination.

If, on the other hand, it is discovered that during an automatic initiation of the emergency call the driver of the motor vehicle is not responsive or capable of driving, this can be taken into account in selecting the destination.

The autonomous vehicle function of the motor vehicle can be activated, for instance, if the emergency call has been initiated manually and the driver is incapacitated, such that the motor vehicle can be driven autonomously to the destination. In this autonomous driving mode, the driver necessarily does not interact with the vehicle in getting the motor vehicle to the destination.

On the other hand, if the emergency call was initiated manually and it is determined that the driver is not responsive, the autonomous driving function of the motor vehicle may not be activated, because it can be assumed that a child or other occupant of the motor vehicle may have inadvertently initiated the emergency call, for example. In such a case, it is not advisable to allow the motor vehicle to drive itself to the destination. The same applies if, after a manually initiated emergency call, the query to the driver of the motor vehicle shows that there is no need for aid.

Autonomous driving of the motor vehicle can be activated and the motor vehicle can autonomously drive to the destination when the emergency call is initiated automatically and the driver is incapacitated, and/or the driver is non-responsive. Because this can ensure that the destination is very safely and reliably reached and in addition quick aid can be provided for the incapacitated or non-responsive driver or other passengers of the motor vehicle.

Embodiments of the present disclosure can monitor whether during the trip the driver of the motor vehicle is still able to drive the vehicle to the destination, said monitoring being performed by at least one monitoring device of the motor vehicle. If the driver's capacity to drive is impaired, at least a warning signal can be issued. In addition, or alternatively, if the driving capacity is impaired, autonomous driving of the motor vehicle can be activated and the motor vehicle can be autonomously driven to the destination. Thus, even in a case in which the driver initially would like to drive himself to the destination, but due to tiredness or nervous stress (for example if in a state of shock) is no longer capable to a sufficient degree to safely get the motor vehicle to the destination.

The system for determining a route from a motor vehicle location to a destination according to embodiments of the present disclosure comprises a control device of the motor vehicle. The control device is designed to transmit an emergency call to a recipient of a central exchange of the system. A computing device of the exchange is designed to determine the route to the destination. Here, the computing device is designed to take into account, in selecting the destination, a first time period which the motor vehicle requires to traverse the route and a second time period which a rescue vehicle requires to reach the destination. The computing device is also designed to select the destination such that a sum of the two time periods is minimal.

The advantages for the method according to embodiments of the present disclosure also apply for the system according to embodiments of the present disclosure, and vice versa.

The features and feature combinations cited above in the description and below in the description of the figures and/or in the figures alone are useful not only in the respective combination given, but also in other combinations or alone, without abandoning the scope of the present disclosure. Thus, those embodiments which are not explicitly shown in the figures or are explained but arise and can be enabled through separate feature combinations of the embodiments explained are also considered to be encompassed by the present disclosure. Thus, embodiments and combinations which do not comprise all features of an originally formulated independent claim are also considered to be disclosed.

BRIEF DESCRIPTION OF THE DRAWINGS

Other advantages, features and details of the present disclosure result from the claims, the description below of embodiments and the drawings, in which:

FIG. 1 shows a schematic of a situation in which a motor vehicle has issued an emergency call and a rescue vehicle is being routed to a common meeting point, in accordance with various embodiments;

FIG. 2 shows a flow diagram for illustrating the use of autonomous driving functions of the motor vehicle to reach the common meeting point, in accordance with various embodiments.

DETAILED DESCRIPTION

Figure 3:
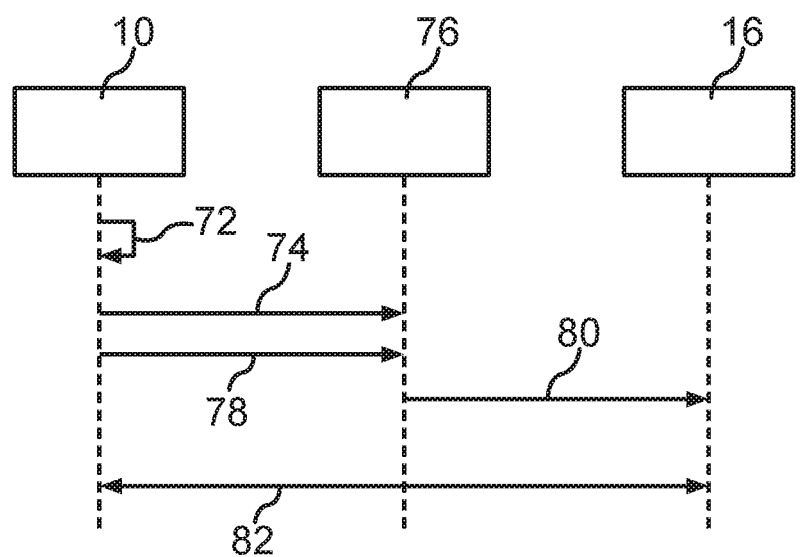
FIG. 3 shows a schematic of the transfer of data which include the geographic position of the motor vehicle to a central exchange, in accordance with various embodiments.

Shown in FIG. 1 are components of a system for optimizing a rescue time or rescue route in the event of a manual or automatic emergency call. Accordingly, a motor vehicle 10 comprises a control device in the form of a controller 12. In response to a manual or automatic initiation of an emergency call, the controller 12 establishes a connection to a receiving device or receiver 14 of a central exchange 16 in the form of an emergency exchange or call center, for example, with a corresponding server and computing device 18.

The emergency call results in transmission of a data packet to the receiver 14, the packet indicating the geographic position of the motor vehicle 10, i.e. the location of the motor vehicle 10. The transmission of the geoposition of the motor vehicle 10 can be done by way of SMS or an inband modem, i.e. a data channel which can be used to transmit both voice messages and data.

FIG. 3 illustrates a way to transmit the geographic position of the motor vehicle 10 to the receiver 14 of the central exchange 16 by way of the inband modem. After the emergency call is initiated 72, also known as an eCall, a voice connection 74 can first be established to a server 76, also known as a back end. The voice channel for the voice connection 74 can be used for inband data transmission 78 to server 76 after the connection is established. Then, a data transmission 80 to the receiver 14 of the exchange 16 from the server 76 takes place. However, communication can also be achieved through a voice connection 82 from the vehicle 10 to the exchange 16 and vice versa. Calculations of an optimum route 28, 32 to a destination 20 (see FIG. 1) are done in the computing device 18 of the exchange 16 (not shown in FIG. 3); the device can comprise a server and a database, for example. The results of the calculation are then sent to the motor vehicle 10 by way of the server 76.

In addition, or alternatively, the transmission of the geoposition can also be done by way of an IP communication through the back end or the server 76. Thus, a computer network can be used in which the data transmission can occur according to Internet standards.

In the situation shown in FIG. 1, therefore, a manual or automatic emergency call is triggered. The emergency call is received by the exchange 16, whereby the geographic position of the motor vehicle 10 is transmitted. After receipt of the emergency call, the (emergency) exchange 16 or call center uses the computing device 18 of the exchange 16 to search for possible meeting points or destinations 20, 22 classified as safe in the vicinity of the motor vehicle 10. These destinations 20, 22 can be public parks, rest stops or the like, for example.

When the possible destinations 20, 22 or meeting points within the vicinity of the motor vehicle 10 are determined, consideration is also given to whether rescue teams or rescue vehicles 24 are located in the vicinity of the motor vehicle 10 or the possible destinations 20, 22. For example, in FIG. 1 only a rescue vehicle 24 is shown, which is located in the vicinity of the motor vehicle 10. Thus, the computing device 18 first determines the presence of safe meeting points or destinations 20, 22 in the vicinity of the motor vehicle 10 and in the vicinity of rescue teams or rescue vehicles 24 which are near to the motor vehicle 10.

Then, different appropriate routes from the motor vehicle 10 to the destinations 20, 22 and from the rescue vehicle 24 to the destinations 20, 22 are calculated. For example, a first route 26 leads from the motor vehicle 10 to destination 22 which is further away from the motor vehicle 10 than destination 20. Correspondingly, a second route 28 leads from the motor vehicle 10 to destination 20, which is further away.

The same applies to a shorter route 30 by distance traveled from the rescue vehicle 24 to destination 22 and for a longer route 32 by distance traveled from the rescue vehicle 24 to destination 20. However, the computing device 18 determines the respective time periods required by the motor vehicle to traverse the shorter route 26 on the one hand and the longer route 28 on the other hand. The computing device 18 also determines the respective time periods which the rescue vehicle 24 needs to traverse the shorter route 30 by distance traveled and the longer route 32 by distance traveled.

In the selection of destination 20, which is deemed to be the meeting point for the motor vehicle 10 and the rescue vehicle 24, the computing device 18 optimizes the routes 26, 28, 30, and 32 with regard to travel time. The meeting point or destination 20 which requires the shortest total travel time becomes the destination selected by the computing device 18. In this case, for example, the vehicle 10 can get to destination 20 faster along route 28, which is longer by distance traveled, than it takes to get to destination 22, which is closer, along the shorter route 26. Likewise, the rescue vehicle 24 can get to destination 20 faster along route 32, which is longer by distance traveled, than it takes to get to destination 22, which is closer along the shorter route 30. In this case, destination 20 is selected as the common meeting point. Route 28, 32 to safe meeting points is therefore optimized with regard to minimum possible travel time of the motor vehicle 10 and the rescue vehicle 24 or rescue team.

A transmitting device of the central exchange 16 then transmits the position of the meeting point or destination 20 as well as the route information relating to route 28 and route 32 to a navigation system 36 of the motor vehicle 10 on the one hand and to a navigation system 38 of the rescue vehicle 24 on the other hand. The position of the meeting point and the route information are thus sent to the motor vehicle 10 and to the rescue team or rescue vehicle 24. Then, the motor vehicle 10 and the rescue vehicle 24 make their way to the meeting point or destination 20.

FIG. 2 explains the use of automated or autonomous driving functions 70 (see FIG. 1) of the motor vehicle 10 sending the emergency call for purposes of driving the meeting point or destination 20.

In a first step 40, a manual or automated emergency call is triggered or initiated by the motor vehicle 10. The emergency call controller 12 of the motor vehicle 10 then establishes the connection to the central exchange 16 or call center and transmits the geographic position or location of the motor vehicle 10, and other information. In particular, the controller can be equipped with a gateway here.

Before transmitting the position of destination 20 to the motor vehicle 10 and the rescue vehicle 24, safe meeting points and/or destinations 20, 22 are, for example, filtered from map information and existing swarm data in the vicinity of the motor vehicle 10 and the rescue vehicle 24 or rescue team. For example, the computing device 18 can access a database 42 in which collected swarm data are available as a basis for calculating the routes 26, 28, 30, 32.

Then, an initial determination can be made through a voice connection between the central exchange 16 and the motor vehicle 10 as to whether the person or driver in the motor vehicle 10 is responsive. In this regard, a variety of cases or scenarios are conceivable. For example, in block 44 (see FIG. 2) it is first determined whether a manual emergency call 46 or an automatic emergency call 48 had been initiated.

In the case of a manual emergency call 46, in a first step a check is made to see if the driver is responsive. If not, the method proceeds to block 52 in which nothing is done. This ensures that the rescue vehicle 24 is not sent out due to an inadvertent initiation. If, on the other hand, the driver is responsive, in step 54 he is asked whether help is required. If not, nothing is done (block 52). On the other hand, if help from emergency teams in the rescue vehicle 24 is needed, the driver is asked in a next step 56 whether the person or driver of the motor vehicle 10 is capable of driving. If the driver is capable of driving, the optimum route 28, 32 to the meeting point or destination 20 is sent to the rescue vehicle 24 and the motor vehicle 10 and the driver can decide to drive 58 to the meeting point or destination 20 by himself.

On the other hand, if the driver is not able to drive, in another block shown in FIG. 2 the autonomous driving function 70 of the motor vehicle 10 is activated 60. Accordingly, corresponding devices in the motor vehicle 10, which are not shown in detail in FIG. 1, provide for the automatic, autonomous driving of the motor vehicle 10 to the destination 20. Activation 60 of the autonomous driving function 70 also occurs when the driver, who is able to drive the vehicle, decides, subsequent to step 56, that he does not wish to drive by himself to destination 20. The driver can activate the autonomous driving function 70 by himself.

In the case of an automatic emergency call 48, a check is also made in a first step 62 to see if the driver of the motor vehicle 10 is responsive. If not, the autonomous driving function 70 is activated 60. On the other hand, if the driver is responsive, in a subsequent step 64 the question is asked whether the driver (or another passenger in the motor vehicle 10) can drive the vehicle. If the driver (or the other passenger) is not able to drive, the autonomous driving function 70 is again activated 60. On the other hand, if the driver is able to drive, he can decide to drive 58 the vehicle himself or to activate autonomous driving. The respective optimized route 28, 32 to the meeting point or destination 20 is also sent to the rescue vehicle 24 and the motor vehicle 10 when the autonomous or automated driving function 70 is activated. The automated driving functions 70 then assume control of the motor vehicle 10 and drive the vehicle to the meeting point or destination 20.

If the driver of the motor vehicle 10 has decided to drive 58 the vehicle himself, the driver will be monitored by a monitoring device, in the form of sensors 66 (see FIG. 1) to assess his capacity to drive. This occurs in step 68 in FIG. 2. If the system, i.e. the monitoring device, recognizes a negative change in the driving capacity of the driver, warning signals are issued. This is the case in particular when tiredness on the part of the driver is seen in the form of a camera and/or a gaze detection device using sensors 66, for example. If the testing in step 68 shows that the driver continues to be able to drive 58 by himself, the driver can continue to drive the motor vehicle 10 to the destination 20. On the other hand, if the driver is no longer able to drive the motor vehicle 10 himself, the autonomous driving function 70 takes over and the motor vehicle 10 is driven to the meeting point or destination 20 with no further intervention by the driver. Here, a voice connection can be maintained to the central exchange 16, at least until the destination 20 is reached, and also until the rescue vehicle 24 has arrived at the destination.

Regardless of whether the motor vehicle 10 has been driven by the driver or by way of the autonomous driving function 70 to the destination 20, the route 28, 32 to the meeting point or destination 20 which has been classified as safe is calculated in a manner optimized for time at the central exchange 16. Here, access to database 42 can allow swarm data to be used as a basis for the calculation of the routes 26, 28, 30, 32.

Parameters which affect or impair the time of arrival, i.e. the time period required to traverse the respective route 26, 28, 30, 32 and which can be acquired from the swarm data include, for example, the current traffic volume, the traffic volume during rush hours (for example during a shift change), traffic light cycles, road conditions on the respective route 26, 28, 30, 32 and the like. For example, whether or not the route 26, 28, 30, 32 is cleared in winter can play a role. Moreover, speed limit information along the respective routes 26, 28, 30, 32 can be taken into account using map information and/or the swarm data available in the database 42 in determining the time periods required to traverse these routes. What can also be determined from the swarm data and/or map data is whether speed limits along the respective route 26, 28, 30, 32 can be exceeded while still remaining safe during driving.

The route 28, 32 can be displayed in the respective navigation system 36, 38 of the motor vehicle 10 and the rescue vehicle 24 whether the driving 58 to the destination 20 is being done by the driver or by autonomous driving, i.e. through activation 60 of the autonomous driving function 70. For example, the current position of the rescue team or rescue vehicle 24 is shown on a display of the navigation system 36 in the motor vehicle 10 and/or data such as the time until the rescue vehicle 24 reaches the destination 20. It is very calming to the driver of the motor vehicle 10 to always be informed about when the rescue vehicle 24 will reach the meeting point. Such calming is therefore advantageous to the state of health of the driver of the motor vehicle 10. Moreover, the time when the motor vehicle 10 itself will arrive at the meeting point or destination 20 can be displayed in the navigation system 36 of the motor vehicle 10.

The computing device 18 can cyclically calculate optimum routes in the background based on swarm data in particular. In the process, if it is found that a change in the selected route 28, 32 is required or sensible, the corresponding route information is transmitted to the navigation system 36 of the motor vehicle 10 and to the navigation system 38 of the rescue vehicle 24. In this calculation carried out by the computing device 18, it can also become necessary to select a new meeting point or new destination. Also, if the motor vehicle 10 and/or the rescue vehicle 24 can go faster than expected along the respective route 28, 32, for example, this can be used as a trigger or initiator to re-calculate an optimum route.

What is claimed is:

1. A method comprising:
   receiving, by a computing device of a central exchange, an emergency call from a motor vehicle; and
   determining, by the computing device of the central exchange, a route from a location of the motor vehicle to a destination of the motor vehicle, the destination selected based at least in part on a first time period for the motor vehicle to traverse the route, and a second time period for a rescue vehicle to reach the destination, the destination selected such that a sum of the first and second time periods is minimal; and
   determining the first and second time periods based at least in part on data made available from one or more other vehicles, the data including at least one of:
      traffic signal switching behavior along the route of the motor vehicle and/or a route of the rescue vehicle to the destination, or
      at least one speed limit that can be exceeded along the route of the motor vehicle and/or the route of the rescue vehicle to the destination while maintaining a safe driving mode of the motor vehicle and/or the rescue vehicle.

2. The method according to claim 1, further comprising:
   determining, by the computing device of the central exchange, a plurality of possible destinations based at least in part on at least one of map data or the data made available from the one or more other motor vehicles; and
   selecting the destination from the plurality of possible destinations.

3. The method according to claim 2, further comprising selecting, by the computing device of the central exchange, a plurality of possible rescue vehicles based at least in part on at least one of a distance of the plurality of possible destinations from the motor vehicle, or a distance of the plurality of rescue vehicles from the motor vehicle.

4. The method according to claim 1, further comprising transmitting to a navigation system of the motor vehicle, by a transmitting device of the central exchange, data indicating at least one of a geographic position of the destination, or the route from the motor vehicle to the destination.

5. The method according to claim 4, further comprising transmitting to a navigation system of the rescue vehicle, by the transmitting device of the central exchange, data indicating at least one of the geographic position of the destination, or the route from the rescue vehicle to the destination.

6. The method according to claim 1, further comprising:
   examining, by the computing device of the central exchange, whether at least one assumption made in the selection of the destination is appropriate while the motor vehicle and the rescue vehicle are en route to the destination based at least in part on at least one of traffic information or the data made available by the one or more other vehicles;
   determining, by the computing device of the central exchange, a deviation of the at least one assumption; and
   updating, by the computing device of the central exchange, at least one of the route of the motor vehicle, the route of the rescue vehicle, or the destination based at least in part on the deviation.

7. The method according to claim 1, wherein the first and second time periods are determined based at least in part on data made available from a traffic central exchange.

8. The method according to claim 1, further comprising determining, by the computing device of the central exchange, based at least in part on the data made available from the one or more other vehicles, at least one of:
   current traffic volume;
   an expected change in the traffic volume depending on a day of a week and/or time of day;
   road conditions along the route of the motor vehicle and/or the rescue vehicle to the destination; or
   at least one speed limit along the route of the motor vehicle and/or the rescue vehicle to the destination.

9. The method according to claim 1, further comprising determining, by a control device in the motor vehicle, whether a driver of the motor vehicle is unresponsive;
   and wherein the emergency call from the motor vehicle is automatically initiated by the motor vehicle when the driver is determined to be unresponsive.

10. The method according to claim 9, further comprising activating, by the control device of the motor vehicle, an autonomous driving function of the motor vehicle when it is determined that the driver is unresponsive or otherwise unable to drive the motor vehicle to the destination, such that the motor vehicle is autonomously driven to the destination.

11. The method according to claim 10, further comprising:
- monitoring, by at least one monitoring device of the motor vehicle, whether the driver of the motor vehicle is able to drive the motor vehicle while the motor vehicle is driving to the destination; and
- determining, by the at least one monitoring device of the motor vehicle, that the driver is unable to drive based at least in part on the monitoring; and
- responsive to determining that the driver is unable to drive:
  - issuing, by the control device of the motor vehicle, a warning signal, or
  - activating, by the control device of the motor vehicle, the autonomous driving function of the motor vehicle.

12. A system for determining a route from a location of a motor vehicle to a destination, comprising:
- a computing device of a central exchange configured to receive an emergency call from the motor vehicle, and to determine the route to the destination, the destination selected based at least in part on a first time period for the motor vehicle to traverse the route, and a second time period for a rescue vehicle to reach the destination, the destination selected such that a sum of the first and second time periods is minimal, the first and second time periods determined based at least in part on data made available from one or more other vehicles;
- wherein determining the first and second time periods comprises determining, based at least in part on the data made available from the one or more other vehicles, at least one of:
  - traffic signal switching behavior along the route of the motor vehicle and/or a route of the rescue vehicle to the destination, or
  - at least one speed limit that can be exceeded along the route of the motor vehicle and/or the route of the rescue vehicle to the destination while maintaining a safe driving mode of the motor vehicle and/or the rescue vehicle.

* * * * *